UNITED STATES PATENT OFFICE.

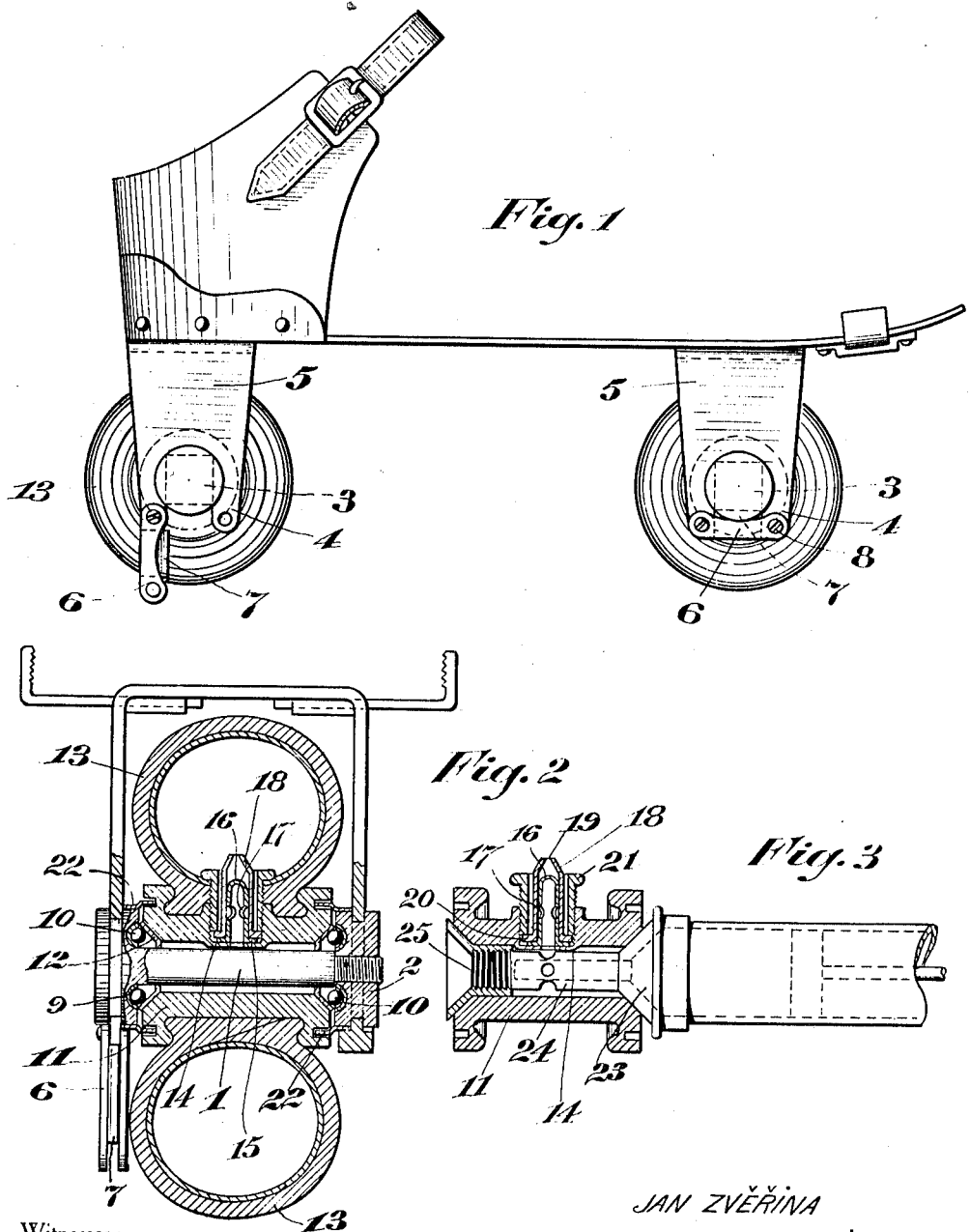

JAN ZVĚŘINA, OF MONTREAL, QUEBEC, CANADA.

ROLLER-SKATE.

988,533. Specification of Letters Patent. Patented Apr. 4, 1911.

Application filed January 27, 1910. Serial No. 540,313.

*To all whom it may concern:*

Be it known that I, JAN ZVĚŘINA, a subject of the Emperor of Austria-Hungary, residing in the city and district of Montreal, in the Province of Quebec, Canada, have invented certain new and useful Improvements in Roller-Skates; and I do hereby declare that the following is a full, clear, and exact description of the invention, such as will enable others skilled in the art to which it appertains to make and use the same.

The invention to be hereinafter described relates to roller skates, and more particularly to the construction and mounting of the roller and to a means for inflating the roller.

Broadly speaking, it comprises a removable non-rotating axle, ball cups secured to the ends of the axle, a tubular rollar hub revolubly mounted on the axle, ball cones carried by the ends of the hub, ball bearings interposed between the cups and cones, dust guards carried by the axle ends, a pneumatic tube tread carried by the tubular hub, an inflation valve leading from the interior of the hub to the interior of the pneumatic tread, and means for securing the removable axle in place; together with a pump attachment for inflating the pneumatic tread.

In order to more clearly disclose the construction, operation and use of the invention, reference should be had to the accompanying drawings forming part of the present invention.

Throughout the several figures of the drawings, like reference characters designate the same parts.

In the drawings: Figure 1 is a side elevation of a skate with the invention applied; Fig. 2 is an enlarged vertical cross section through one of the rollers, as applied; and, Fig. 3 is an enlarged vertical cross section taken longitudinally through a detached hub, and showing the pump attachment.

The main objects of the invention are to provide a simple, economical roller of durable construction; one which may be quickly and cheaply renewed or repaired; and one which may be easily and quickly inflated.

Referring to the drawings in detail, 1 indicates a non-rotary axle provided with heads 2 having non-circular grooves 3. As shown in the drawings, these grooves are square. They may, however, be any other non-circular shape or form. The upper part and sides of these grooves receive the fixed parts of yokes 4 formed on the lower parts of the supporting brackets or arms 5 of the skate body. The open side of the yoke may be closed by a link 6, which is pivotally connected at one end to one side of the yoke and carries a bearing plate 7 adapted to fit the lower face of the groove 3 and so complete the yoke. This link is held in operative position by a pin 8, which is passed through openings in the free end of the link and the yoke. When the link is secured in position, of course, the yoke fits closely the non-circular groove 3 and so absolutely prevents rotation and falling out of the axle 1. Each head 2 is formed with a concave annular ball race or cup 9 in which are adapted to travel the ball bearings 10. About the axle 1 is revolubly mounted the tubular hub 11, the opposite ends of which are provided with bevel seats or ball cones 12 adapted to coöperate with the cups 9 for the ball bearings 10, as shown in Fig. 2. This hub, of course, is provided with seats for a pneumatic tire or tread 13. In order to inflate this tire, a screw-threaded valve opening has been made extending laterally through one wall of the hub 11. This opening is formed with an offset flange or shoulder 14, upon which may be seated the flange 15 of a rigid metal thimble 16 having air passages 17. Outside of this metal thimble is closely sleeved a thin flexible rubber thimble 18, having an open upper end 19 and a lower flange 20 adapted to be seated on the flange 15 of the steel thimble 16. These several flanges 15 and 20 may be tightly clamped together and against the shoulder 14 by means of the threaded sleeve 21 which may be turned tightly down in the valve opening, until its lower end rests on the upper flange 20. The bore of the sleeve 21 is slightly greater than the exterior diameter of the flexible thimble 18, thus leaving a small annular space between the two. Consequently, as air is forced in through the perforations 17 of the thimble 16, the outer thimble 14 will be forced outward and the air will enter the tube of the tread and inflate it. On the other hand, it will not be possible for air to escape from the tube, because, as it goes through the openings 17, it will draw the flexible rubber of the thimble 16 into these openings and so seal them. In this way, the flexible rubber nipple constitutes a means for preventing deflation of the roller tire. It is advisable, of course, to prevent entrance of dust to the moving parts. Accordingly, the ends of the tubular hub are provided with annular grooves adapted to freely receive a part of the dust bands 22, which are made fast to the heads of the tubular hub. In this way, the interior spaces between the ends of the tubular hub and the heads 2 are bridged and all dust excluded.

In order to inflate the roller tire or tread, a special pump attachment is provided so that air may be forced through the inner metal nipple 16 from the interior of the hollow hub. To effect this, one end of the tubular hub is closed air-tight, and the opposite end is similarly closed, except for the entrance of the pump connections. This special construction comprises a conical head 23 formed on the end of the pump barrel and having a taper to fit the taper of the hub end, a rigid perforated tube 24 leading from the conical head and provided with a closed outer end having a threaded portion adapted to coöperate with the interior threads formed in the end of a conical shell 25 which is adapted to fit the opposite end of the tubular hub and make an air-tight closure. When it is desired to inflate the pneumatic tread, the shell 25 is slid into one end of the tubular hub, as shown in Fig. 3, and the tube 24 is passed into the opposite end and turned into the threaded portion of the shell 25. As the pump barrel is turned (the shell 25 being held stationary) the cone 23 and shell 25 will be drawn toward each other and firmly seated on the tapered faces in the ends of the tubular hub. When the joints are tight, the pump may be operated. The air will then pass through the perforations in the tube 24 into the interior of the tubular hub, and thence through the openings of the nipple 16 and into the pneumatic tread, and inflate it.

It is thought that the operation and use of the invention will be clear from the preceding detailed description.

Changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new and desire to secure by Letters Patent, is:—

1. In combination with a skate, brackets for supporting the rollers, non-rotary axles removably mounted in said brackets, tubular roller hubs revolubly mounted on said axles and provided with lateral passages, pneumatic tires mounted on said hubs and inflation valves located in said passages and extending slightly into the interior of said tires.

2. In combination, a bracket, a non-rotary axle mounted in said bracket, a tubular roller hub mounted on said axle and provided with a lateral passage, a pneumatic tire mounted on said hub and an inflation valve located in said passage and extending slightly into the interior of said tire.

3. In combination, in rollers, a tubular hub provided with a lateral passage, a pneumatic tire mounted on said hub and an inflation valve located in said passage and extending slightly into the interior of said tire.

In witness whereof I have hereunto set my hand in the presence of two witnesses.

JAN ZVĚŘINA.

Witnesses:
W. S. BABCOCK,
V. COEHUE.